Nov. 13, 1951   G. R. COSS   2,574,625
METHOD OF MAKING HIGH-PRESSURE SWIVEL HOSE COUPLINGS
Filed Nov. 21, 1946
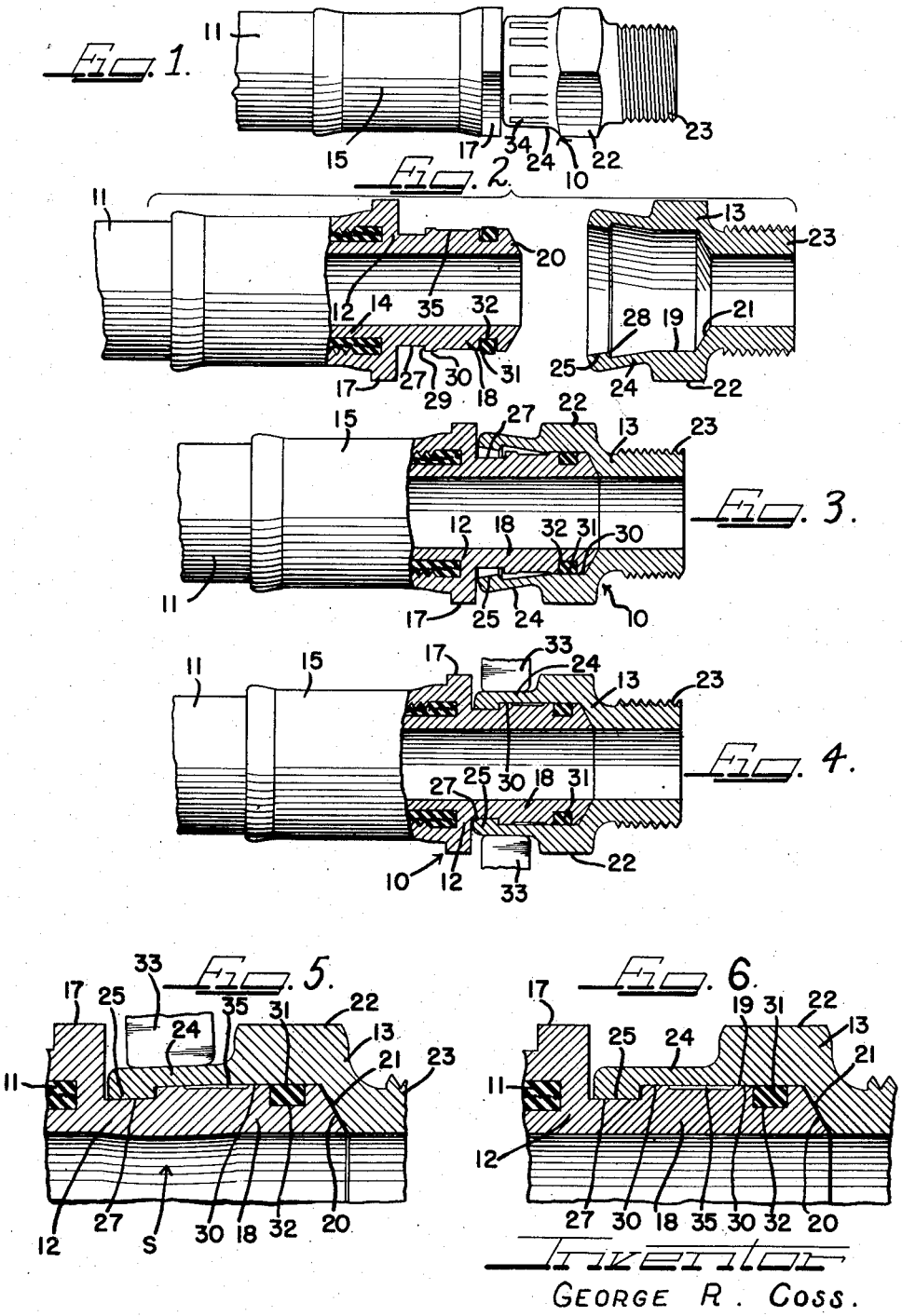
INVENTOR
GEORGE R. COSS.

Patented Nov. 13, 1951

2,574,625

UNITED STATES PATENT OFFICE 2,574,625

METHOD OF MAKING HIGH-PRESSURE SWIVEL HOSE COUPLINGS

George R. Coss, St. Clair Shores, Mich., assignor to Flex-O-Tube Company, Detroit, Mich., a corporation of Illinois Application November 21, 1946, Serial No. 711,451

2 Claims. (Cl. 29—148)

1

This invention relates to improvements in making high pressure swivel hose couplings, and more particularly concerns the making of hose couplings of this character adapted for use with flexible hose.

Two major problems which confront the designer of a high pressure swivel hose coupling are, first, the attainment of adequate structural resistance to high pressure; and, second, the provision of a construction which can be produced at a profit competitively. There are also, of course, other factors of importance such as satisfactory leak-proofing, good swivel action, and general appearance and operational characteristics consistent with a high standard of quality and performance requirements.

It is accordingly an important object of the present invention to provide an improved method of making a swivel hose coupling wherein the barest minimum number of components are assembled in a novel manner to provide a unit which is unusually capable of withstanding high pressure service conditions.

Another object of the invention is to provide an improved high speed mass production method of making swivel hose couplings wherein unusually close swivel bearing clearances are attained.

Still another object of the invention is to provide an improved method of making swivel hose couplings wherein the component parts may be made by screw machine methods of manufacture requiring relatively large tolerances in finished dimensions but wherein the final assembly attains unusually close bearing relationship between the relatively swiveling parts.

A further object of the invention is to provide an improved method of making swivel hose couplings which attains not only an exceptionally strong burst-proof assembly but also a highly leak-proof relationship between the relatively rotatable components of the assembly.

It is also an object of the invention to provide an improved method of assembling a simple two-piece swivel coupling.

Other objects, features and advantages of the present invention will be readily apparent from the following description taken in conjunction with the accompanying sheet of drawings, in which:

Figure 1 is a side elevational view of a swivel hose coupling made according to the method of the present invention;

Figure 2 is a view, partially in longitudinal section, of the components of the swivel hose coupling before assembly;

2

Figure 3 is a view, partially in longitudinal section, showing the swivel coupling components in an initial stage of assembly;

Figure 4 is a view similar to Fig. 3, but showing the swivel coupling components in a further stage of assembly according to the present method;

Figure 5 is an enlarged, fragmentary, longitudinal sectional view through the components of the swivel hose coupling illustrating a further step in the method of assembly; and Figure 6 is a fragmentary sectional view similar to Fig. 5, but showing the components of the swivel coupling in the final stage of assembly.

A flexible hose coupling 10, made according to the present method, is adapted to be secured to the end of a flexible hose 11 which may be of any preferred high pressure type. The coupling 10 comprises two principal component parts, namely, a tubular body member 12 and a tubular swivel member 13 which are adapted to be made from suitable material such as brass or steel, or one from brass and the other one from steel, by mass production methods of manufacture, such as by means of a screw machine.

The body member 12 is formed in one piece and includes an integral tubular stem or insert 14 which is adapted to fit within the mouth of the hose 11 and against which the end portion of the hose is clamped securely by means of an integral, larger diameter skirt 15 encompassing the same. The skirt 15 is adapted to be contracted by crimping or swedging or the like, into the clamping relationship.

At the juncture of the stem and skirt portions of the body, is provided an outwardly radial wrench shoulder 17 by which the body is adapted to be engaged for assembly purposes.

Extending coaxially in the opposite direction from the insert 14 is an integral elongated cylindrical stem or head 18 on the body 12 which is adapted to fit relatively rotatably within an enlarged counterbore 19 in the swivel member 13. The principal bores of the body part 12 and the swivel member 13 may be conterminous, with the extremity of the head 18 formed on an outward taper 20 substantially complementary to a tapered wall or shoulder 21 at the inner end of the counterbore 19.

Providing a substantial reinforcing mass of material about the shoulder 21 is a radially outward flange or shoulder 22 on the swivel member providing wrench faces. Merging with the reinforcing and wrench shoulder 22 and projecting axially outwardly away from the tapered shoulder 21 is an externally threaded nipple 23.

Projecting axially in the opposite direction and defining the counterbored extremity of the swivel member 13 is a skirt 24 which is of relatively thin wall cross section and terminates in a radially inwardly extending attachment flange 25 of preferably approximately twice the width and twice the thickness of the skirt 24. The attachment flange 25 is adapted to fit interlockingly within a radially outwardly opening groove 27 formed at the base of the head 18. A thrust shoulder 28 at the inner side of the flange 25 axially opposes an axially inwardly facing thrust shoulder 29 at the outer side of the groove 27.

From Fig. 6 it will be observed that the head 18 presents a cylindrical gland or bearing surface 30 of substantial length to the radial inner bearing surface provided by the counterbore 19. Thereby a high degree of lateral stability is attained, especially where a relatively close engagement between the radial bearing surfaces prevails.

Leakage of high pressure fluid through the joint between the head 18 and the swivel member 13 is prevented by sealing means, herein comprising a sealing ring 31 formed from resilient material such as rubber or rubber substitute, or the like, and seated within a radially outwardly opening annular groove 32 formed adjacent to the outer extremity of the head 18. The sealing ring 31 is preferably of an initially greater outside diameter than the outside diameter of the radial bearing surface 30, substantially as shown, perhaps to a somewhat exaggerated degree, in Fig. 2, so that after assembly of the swivel member 13 about the head 18 the sealing ring 31 will be compressed into the groove 32 and bear with some pressure radially against the opposing bearing surface of the counterbore wall 19, thereby affording a substantial seal against the escape of pressure fluid thereby.

According to the present invention the swivel member 13 is formed to be freely assembled axially with the stem 18 as the first step in the method of assembling the components of the coupling 10, the skirt 24 and the retaining flange 25 being initially formed to flare open to a larger diameter than the radial bearing surface 30 of the head. This relationship is illustrated in Figs. 2 and 3. Fig. 3 shows how the assembly appears after completion of the first major step in the method of assembling the principal components and with the tapered end 20 of the head abutting the complementary shoulder 21 within the counterbore 19 of the swivel member. In this, of course, the sealing ring 31, which was preliminarily seated in its groove 32 by expanding it to clear the terminal portion of the head 18 and allowing it to snap into the groove, is placed under at least some radial compression by the bore 19.

Assembly of the components of the swivel coupling is completed simply by contracting the skirt 24 and the retaining flange 25 into substantial concentricity with the head 18 and with the flange 25 interlockingly engaging within the groove 27. Such contraction may be effected in any preferred manner such as by means of crimping or swedging fingers or segments 33 (Figs. 4 and 5) which uniformly engage the flared skirt 24 and the flange 25 externally and squeeze the same uniformly radially inwardly into the contracted state. As a result of such finger crimping or swedging, slight longitudinal tool marks or metal flow ridges 34 (Fig. 1) may appear on the external surface of the skirt 24 between the swedging fingers or segments 33. One incidental result of the contraction of the skirt 24 and the flange 25 is a slight elongation thereof due to metal flow in attaining to reduced diameter and this may show up in the final assembly as a varying degree of axial looseness between the thrust shoulders 28 and 29 or at the beveled end 20 and the opposing shoulder 21, or at both points. However, this axial looseness is of no consequence since a pressure fluid seal is effected between the radial bearing surfaces of the swivel components.

To assure adequate sealing relationship between the radial bearing surfaces of the head 18 and the swivel member 13, as close as practicable a clearance is achieved between such surfaces so that relatively free swiveling of the swivel member 13 is permitted for effecting a coupling while nevertheless a minimum space is left for potential escape of pressure fluid through the joint. In practice it has ben found that in order to afford an effective seal against the escape of pressures up to 30,000 lbs. per sq. in. through the joint of the swivel coupling, it is highly desirable to avoid a clearance between the opposing radial bearing surfaces of the head 18 and the swivel member 13 greater than .002 of an inch while a virtually ideal relationship is attained with a clearance of .001 of an inch. With such a close tolerance, high pressure fluid working through the inner part of the joint between the opposing tapered end surface 20 and the shoulder 21 and against the sealing ring 31 forces the sealing ring 31 axially outwardly and causes the low pressure side of the sealing ring to wedge into the very close spacing between the components, which thereby effectively blocks the escape of pressure fluid through the joint.

In the present instance such close tolerance between the opposing radial bearing surfaces of the head 18 and the swivel member 13 is assured by controlling the radially inward contraction of the skirt 24 and the retaining flange 25. Since the metal of the skirt and flange inherently tend to resist the contraction and due to the inherent resiliency of the metal tend to spring back to a fairly predictable extent from the extreme contraction diameter, the present method contemplates continuing the contraction sufficiently beyond the ultimate desired diameter so that when the contracting pressure is released the flange 25 on the skirt 24 will spring back to substantially the exact ultimate diameter contemplated.

As indicated in Fig. 5, this slight over-contraction results in a sympathetic inward bowing or springing of the subjacent portion of the head 18, substantially as indicated at S. However, such inward springing of the head beyond the set or elastic limits of the metal is carefully avoided so that upon release of the compression the sprung portion S returns to its normal diameter, thereby substantially following the return springing of the flange 25 and contiguous portion of the skirt 24. Since the mass of metal in the sprung portion S is substantially greater than the mass of metal in the flange 25 and the skirt 24, the return springing of the respective parts will be slightly different so that the end result is a clearance differential therebetween of approximately .001 inch ideal and maximum of .002 inch.

At the same time that the over-contraction of the skirt 24 and flange 25 is effected, there is a tendency of the area of the radial counterbore bearing surface beyond the point where the skirt 24 bends radially inwardly on being contracted to follow the over-contracted skirt sympathetically and reduce any oversize clearance that may prevail between such radial bearing area and the opposing radial bearing surface 30 of the head.

To implement this action and also to avoid possible bearing opposition or counteracting strains during the skirt and flange contracting operations, as well as to afford ultimate swivel bearing relief between the radial bearing surfaces, a shallow relief groove 35 is preferably formed in the radial bearing surface 30 of the head, spaced from both the thrust shoulder 29 and the sealing ring groove 32.

In the final assembly as seen in Figs. 1 and 6, a highly functionally stable relationship prevails between the head 18 and the swivel member 13 since the swivel member may be freely rotated about the head and yet there is practically no lateral looseness which would result in relative rocking of the components, and the frictional resistance to swiveling afforded by the sealing ring 31 holds the parts against any substantial non-manipulative relative rotation.

Under high pressure service conditions the sealing ring 31 affords a virtually perfect seal in the very close spacing between the radial bearing surface area 30 on the head 18 and the swivel bore 19, the relatively large mass of material in the reinforcing shoulder 13 and the relatively thick neck by which it is joined with the nipple 23 assures a high degree of bursting resistance, and the relatively large mass of material in the retaining flange 25 assures great resistance to longitudinal separating force which may be generated by the high pressure between the end surface 20 and the opposing shoulder 21. The axial components of force exerted by the pressure fluid on the coupling finds the axial thrust shoulders 28 and 29 amply resistive since the mass of material in the flange 25 strongly resists deformation which under the axial component of force might tend to expand or outwardly deform the same. Couplings made according to the present method have been successfully tested under hose-bursting test pressures up to 30,000 lbs. per sq. in. and have been found to have ample reserve strength even beyond that, having been found wholly unaffected structurally and at the same time thoroughly leakproof.

It will, of course, be understood that various details may be varied through a wide range without departing from the principles of this invention, and it is, therefore, not the purpose to limit the patent granted hereon otherwise than necessitated by the scope of the appended claims.

I claim as my invention:

1. The method of making a swivel hose coupling which comprises forming a tubular body member with a reduced diameter head portion, forming the external surface of the head portion with an annular sealing ring groove adjacent to the tip of the head portion, with a retaining flange receiving annular groove adjacent to the base of the head and substantially spaced from the sealing ring groove, and with a shallow annular relief groove intervening between the first mentioned two grooves and leaving narrow bearing areas between said first mentioned respective grooves and the relief groove, forming a swivel coupling member with a bore including a cylindrical portion of a diameter to closely clear the sealing groove portion of the head and the contiguous bearing area and with a skirt portion flaring radially outwardly and including a terminal generally radially inwardly extending annular retaining flange dimensioned to be received in final assembly within the retaining flange receiving groove of the head and with the juncture of the flaring portion with the cylindrical bore portion adapted to come in assembly at approximately the relief groove, placing a sealing ring within the sealing ring groove and with the perimeter of the ring projecting radially outwardly beyond the cylindrical periphery of the adjacent bearing head, assembling the swivel member onto the head and radially compressing said sealing ring by engagement thereof with the cylindrical portion of the swivel bore, and reducing the diameter of the flaring skirt portion by overcontracting the same uniformly to drive said retaining flange into the retaining flange groove and to press the skirt portion against the bearing area of the head contiguous the retaining flange groove with a pressure that places the last mentioned bearing area under compression but well within the elastic limits of the material of the head contiguous thereto, and releasing the contracting pressure and allowing the skirt portion and the retaining flange to spring to a close swivel clearance relative to the bearing area contiguous the retaining flange groove and the bottom of the retaining flange groove respectively, the relief groove affording relief during the contracting step and also thereafter for any possible distortion that may persist at the juncture of the skirt with the cylindrical bore portion of the swivel member.

2. The method of making a high pressure swivel hose coupling which comprises separately forming a tubular metallic body member and a tubular metallic swivel member, the body member being provided with a head having a radially outwardly opening axial groove spaced from its tip and the swivel member being provided with a flaring skirt formed at its extremity with a generally radially inwardly extending retaining flange adapted to be received within said groove but initially of a diameter to clear said head, axially assembling the swivel member and head to bring said flange into general registration relative to the groove, contracting the flange uniformly into said groove until contact is made with the head, continuing contraction of the flange and the contiguous portion of the skirt and thereby placing the contacted portion of the head also under compression and contraction to a limited extent and controlled to be within the elastic limits of the metal thereof, until the flange has been overcontracted to a slightly smaller diameter than the normal diameter of the contacted portion of the head and from which smaller diameter the flange will spring back to a diameter wherein close swivelling relation to the normal diameter of the encompassed portion of the head is attained, and releasing the contracting force on the flange to permit said contacted portion of the head to spring back to said normal diameter.

GEORGE R. COSS.

REFERENCES CITED

The following references are of record in the file of this patent:

UNITED STATES PATENTS

| Number | Name | Date |
|---|---|---|
| 1,018,207 | Mueller et al. | Feb. 20, 1912 |
| 2,138,946 | Trickey | Dec. 6, 1938 |
| 2,417,350 | Conroy | Mar. 11, 1947 |